(12) United States Patent
Suzuki et al.

(10) Patent No.: US 6,695,995 B1
(45) Date of Patent: Feb. 24, 2004

(54) APPARATUS AND METHOD FOR SETTING POSITION OF MOVABLE MOLD OF MOTOR-DRIVEN INJECTION MOLDING MACHINE

(75) Inventors: Masamitsu Suzuki, Numazu (JP);
Yutaka Yamaguchi, Shizuoka-ken (JP);
Makoto Nishizawa, Numazu (JP);
Takashi Yamazaki, Mishima (JP);
Takahiro Furuno, Gamagoori (JP)

(73) Assignee: Toshiba Machine Co., Ltd., Tokyo (JP)

( * ) Notice: Subject to any disclaimer, the term of this patent is extended or adjusted under 35 U.S.C. 154(b) by 367 days.

(21) Appl. No.: 09/652,213

(22) Filed: Aug. 30, 2000

(30) Foreign Application Priority Data

Aug. 31, 1999 (JP) ............................ 11-245732

(51) Int. Cl.[7] ................................................ B29C 45/64
(52) U.S. Cl. ................. 264/40.5; 264/328.1; 425/150; 425/593
(58) Field of Search .................... 264/40.5, 328.1; 425/150, 451.5, 451.6, 592, 593

(56) References Cited

U.S. PATENT DOCUMENTS

| | | | | |
|---|---|---|---|---|
| 4,726,920 A | * | 2/1988 | Yokota | ............ 264/328.1 |
| 5,059,365 A | * | 10/1991 | Hertzer et al. | ............ 264/40.5 |
| 5,161,594 A | | 11/1992 | Bolton et al. | |
| 5,770,808 A | | 6/1998 | Yokoyama | |
| 6,402,998 B1 | * | 6/2002 | Onishi | ............ 264/40.5 |
| 2002/0028262 A1 | * | 3/2002 | Yamaguchi et al. | ............ 425/150 |

FOREIGN PATENT DOCUMENTS

| | | | |
|---|---|---|---|
| CH | 638 702 A5 | | 10/1983 |
| DE | 42 32 179 A1 | | 12/1993 |
| DE | 196 32 475 C2 | | 10/1997 |
| JP | 59-191558 | | 10/1984 |
| JP | 61-71164 | | 4/1986 |
| JP | 61-255755 | | 11/1986 |
| JP | 62-71620 | * | 4/1987 |
| JP | 64-5654 | | 1/1989 |
| JP | 3-90267 | | 4/1991 |
| JP | 3-155445 | | 7/1991 |
| JP | 3-56654 | * | 8/1991 |
| JP | 3-254351 | | 11/1991 |
| JP | 10-15653 | | 1/1998 |
| JP | 10-58113 | | 3/1998 |

* cited by examiner

*Primary Examiner*—Jill L. Heitbrink

(57) ABSTRACT

A cross head position corresponding to a movable mold position set by a movable mold position setting unit is read out from a correspondence table, the position of the cross head is controlled by a cross head position controlling unit via a servo-motor, and the position of the cross head is converted into a position of the movable mold, whereby target position setting of the movable mold is achieved.

10 Claims, 3 Drawing Sheets

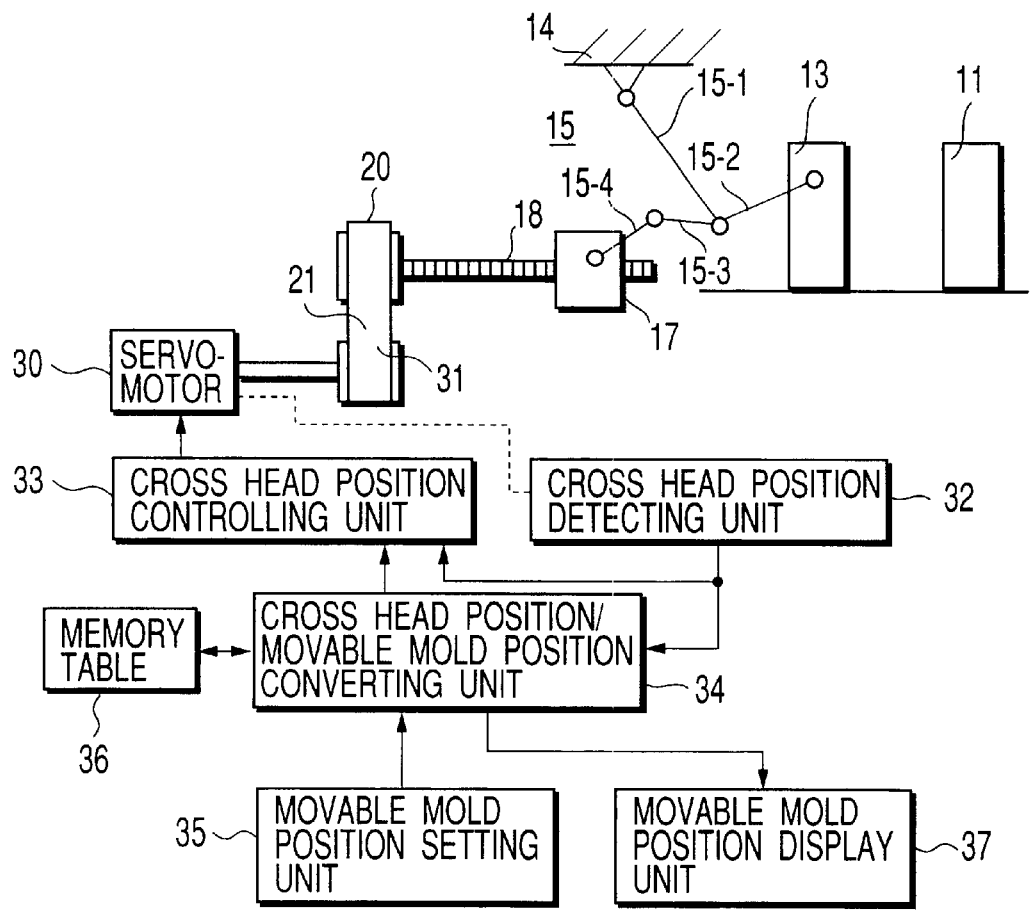
F I G. 2
| MOVABLE MOLD POSITION $d_j$ | CROSS HEAD POSITION $x_j$ |
|---|---|
| $d_0 = 0$ mm | $x_0 = 0$ mm |
| $d_1 = 20$ | $x_1 = 1.0$ |
| $d_2 = 30$ | $x_2 = 5.0$ |
| $d_3 = 40$ | $x_3 = 12.0$ |
| $d_4 = 50$ | $x_4 = 20.0$ |
| ⋮ | ⋮ |
| $d_n =$ | $x_n =$ |
F I G. 3

APPARATUS AND METHOD FOR SETTING POSITION OF MOVABLE MOLD OF MOTOR-DRIVEN INJECTION MOLDING MACHINE

CROSS-REFERENCE TO RELATED APPLICATIONS

This application is based upon and claims the benefit of priority from the prior Japanese Patent Application No. 11-245732, filed Aug. 31, 1999, the entire contents of which are incorporated herein by reference.

BACKGROUND OF THE INVENTION

The present invention relates to an apparatus and method for setting a position of a movable mold of a motor-driven injection molding machine, and particularly to an apparatus and method for setting a position of a movable mold of a motor-driven injection molding machine having a link mechanism for clamping injection molds.

During clamping operation of a stationary mold and a movable mold of the motor-driven injection molding machine, position setting of the movable mold is important. Although this position setting should basically be effected directly on the movable mold, since a servo-motor drives a cross head which is connected to the movable mold via a link mechanism for clamping rather than driving the movable mold directly, the movable mold position is controlled on the basis of the cross head position.

However, because the movable mold and the cross head are connected via a complicated link mechanism, the expression for converting the movable mold position into the cross head position is complicated, and it requires much time to conduct calculation processing thereof.

That is, the operator 1) needs to conduct complicated calculation for converting the movable mold position into the cross head position and 2) necessitates a cumbersome task such as setting the cross head position by actually moving the machine.

In view of the foregoing, it is an object of the invention to provide an apparatus and method for setting a position of a movable mold of a motor-driven injection molding machine which can facilitate position setting concerning clamping operation by simplifying the complicated calculation for converting a movable mold position to a cross head position, and can increase the processing speed.

BRIEF SUMMARY OF THE INVENTION

A position setting apparatus for a movable mold of a motor-driven injection molding machine according to the present invention comprises: means for detecting a position of a first member which is driven by a servo-motor; a memory table in which a correspondence table between position of the first member and position of a second member which is connected to the first member via a link mechanism is preliminarily stored; and means for reading out a position of the second member based on the detected position of the first member with reference to the memory table, wherein position setting of the first member is conducted on the basis of a position error between the read out position of the second member and a target position thereof.

Also, a position setting apparatus for a movable mold of a motor-driven injection molding machine according to the present invention comprises: means for detecting a position of a cross head which is driven by a servo-motor; a memory table in which a correspondence table between position of the cross head and position of a movable mold which is connected to the cross head via a link mechanism is preliminarily stored; and means for reading out a position of the movable mold based on the detected position of the cross head with reference to the memory table; wherein position setting of the cross head is conducted on the basis of a position error between the read out position of the movable mold and a target position thereof.

Also, a position setting method for a movable mold of a motor-driven injection molding machine according to the present invention comprises the steps of: detecting a position of a first member which is driven by a servo-motor; preliminarily storing correspondence between position of the first member and position of a second member which is connected to the first member via a link mechanism in a memory table; reading out a position of the second member based on the detected position of the first member with reference to the memory table; and conducting position setting of the first member on the basis of a position error between the read out position of the second member and a target position thereof.

With these constitutions, it is possible to simplify the complicated calculation for determining the movable mold position from the cross head position and vice versa and facilitate the position setting concerning clamping operation, while increasing the processing speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing the entire configuration of the one embodiment;

FIG. 3 is a chart showing the relationship between the movable mold position and the cross head position;

DETAILED DESCRIPTION OF THE INVENTION

In the following, embodiments of the present invention will be described with reference to the drawings.

Figure 1:
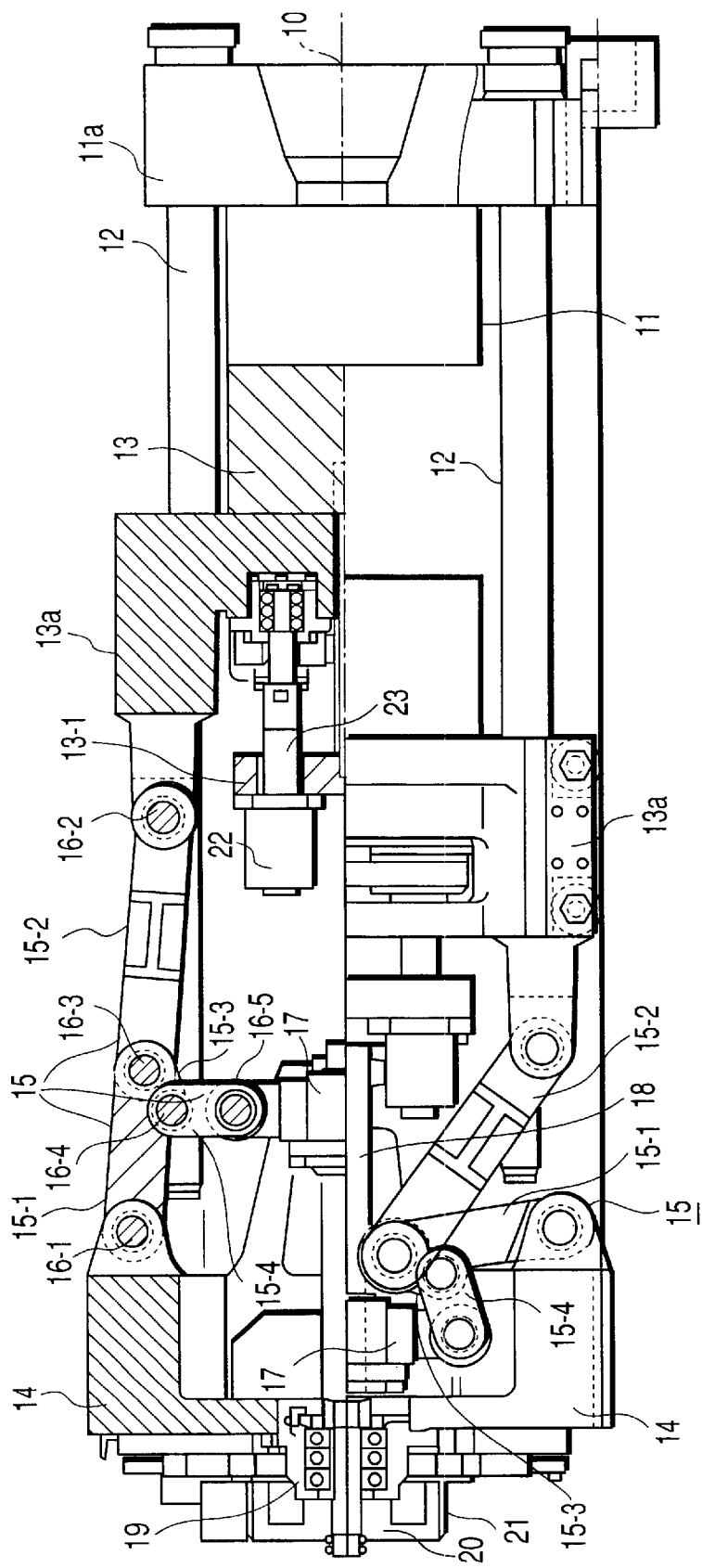
FIG. 1 is a partially sectional view showing a mechanism of a clamping apparatus according to one embodiment of the invention.

FIG. 1 is a side view partially broken away, showing a mechanism of one embodiment in which the present invention is applied to a motor-driven injection molding machine. In FIG. 1, a fixed or stationary mold 11 is connected to a stationary die 11a, and a movable mold 13 is connected to a movable die 13a. A guide bar 12 is fixed at its one end to the stationary die 11a, and inserted into the movable die 13a which is movably held by the guide bar 12.

The other end of the guide bar 12 is fixed to a link housing 14, and the link housing 14 and the movable die 13a are connected by a link mechanism (toggle mechanism) 15. In this embodiment, a toggle mechanism 15 is provided.

In FIG. 1, for easy comprehension of the complicated motion of the toggle mechanism 15, the entire constitution is shown in section with the upper part thereof being broken away along a center axis 10. The toggle mechanism 15 is shown in its extended state in the upper half sectional view, while the toggle mechanism 15 is shown in its bent state in the non-sectional view of the lower half part.

The toggle mechanism 15 is composed of four arms 15-1, 15-2, 15-3 and 15-4, one end of the arm 15-1 being rotatably attached to the link housing 14 by means of a pin 16-1, one end of the arm 15-2 being rotatably attached to the movable die 13a by means of a pin 16-2. The other end of each arm 15-1, 15-2 is rotatably attached to one end of the arm 15-3 by means of a pin 16-3. The other end of the arm 15-3 is rotatably attached to one end of the arm 15-4 by means of a pin 16-4, while the other end of the arm 15-4 is rotatably attached to a link connecting part of a cross head 17 by means of a pin 16-5.

The cross head 17 is formed with a screw hole through which a ball screw 18 for mold opening/closing is inserted. One end of the ball screw 18 is fixed to the rotation axle of a bearing 19 which is fixed to the center part of the link housing 14. One end of the rotation axle of the bearing 19 projects outside the link housing 14, and a pulley 20 fixed thereon with a timing belt 21 for mold opening/closing is connected to a servo-motor and driven.

Inside the movable die 13a, a servo-motor 22 with being fixed on a frame 13-1 is provided, and a ball screw 23 is fixed to the rotation axle of the servo-motor 22 to achieve extrusion of a product after injection molding is performed.

As for the driving mechanism, a hydraulic mechanism, i.e. a hydraulic cylinder may be used in place of the servo-motor.

In this toggle mechanism 15, when the movable mold 13 is separated from the stationary die 11, as shown in the lower half part under the center axis 10, the long arms 15-1, 15-2 of the link mechanism 15 are folded. As the servo-motor (not shown) is driven starting from this state, the ball screw 18 for mold opening/closing rotates via the timing belt 21 for mold opening/closing, and the cross head 17 is moved in the right hand direction of the drawing, i.e. in the clamping direction.

As the cross head 17 moves, the toggle mechanism 15 is gradually extended to be brought into the state that the long arms 15-1 and 15-2 are aligned with each other as shown in the upper half part above the center axis 10 of the clamping apparatus of FIG. 1. Until this state is established, the movable mold 13 moves toward the stationary mold 11 at high speed by virtue of the power assistance of the toggle mechanism with respect to the movement of the cross head 17.

As the servo-motor is further driven from the above state, the cross head 17 is further moved due to the rotation of the ball screw 18 and the movable mold 13 also moves at the same speed as that of the cross head 17. As the servo-motor is further driven after the movable mold 13 has come into contact with the stationary mold 11, the shorter arms 15-3, 15-4 serve as a locking mechanism to lock the longer arms 15-1, 15-2 in the position where they are generally aligned with each other, whereby completing the clamping operation.

In FIG. 1, although the position of the cross head 17 can be accurately comprehended from the number of revolution of the servo-motor, it is impossible to comprehend the position of the movable mold 13 accurately and quickly because of the intervening of the toggle mechanism 15. The present embodiment improves the above-mentioned problem, and hereinafter description therefor will be made in detail by referring to FIG. 2 to FIG. 5.

FIG. 2 shows the entire configuration of the clamping apparatus having the mechanism of FIG. 1, wherein the part corresponding to that of FIG. 1 is designated by the same reference numeral and detailed description thereof is omitted. In addition, since the movable die 13a and the movable mold 13 are connected to each other, the movable die 13a is omitted.

In FIG. 2, the timing belt 21 is engaged between a pulley 31 fixed to the rotation axle of the servo-motor 30 and the pulley 20, and the rotational force of the servo-motor 30 is transmitted to the ball screw 18.

Since the number of revolution of the servo-motor 30 has a certain relationship with the number of revolution of the ball screw 18, by counting the number of revolution of the servo-motor 30, it is possible to obtain the movement position of the cross head 17 accurately. For this reason, the servo-motor 30 is provided with an encoder, which is shown as a cross head position detecting unit 32 in FIG. 2.

The servo-motor 30 is driven by a cross head position controlling unit 33 which operates as a motor driving unit under the control of a cross head position/movable mold position converting unit 34. The number of revolution of the servo-motor 30 is continuously checked by the cross head position detecting unit 32 and the detection output is fed back to the cross head position/movable mold position converting unit 34.

A target position of the movable mold 13 at the time of clamping is set by a movable mold position setting unit 35 by an operator or a user, and a set position command is supplied to the cross head position/movable mold position converting unit 34. The cross head position/movable mold position converting unit 34 reads out a corresponding cross head position by referring to a memory table 36 which is prepared for converting the supplied position command of the movable mold 13 into the corresponding cross head position. This memory table 36 has contents as shown in FIG. 3, for example, the detail of which will be described later.

The cross head position thus read out is supplied to the cross head position controlling unit 33 as a cross head position command. The cross head position controlling unit 33 compares the received position command with the output of the cross head position detecting unit 32 and supplies to the servo-motor 30 with driving current until the received position command coincides with the output of the cross head position detecting unit 32. When the coincidence is established, the movable mold 13 has reached to the target position.

Incidentally, to the cross head position/movable mold position converting unit 34, a movable mold position display 37 is connected so that the current position of the movable mold 13 reverse-converted from the detected cross head position is displayed every moment as will be described later.

In the following, with reference to FIGS. 3 to 5, the operation of the embodiment shown in FIGS. 1 and 2 will be described in detail.

At first, assuming that the link mechanism 15 is folded, and the movable mold 13 is in the position shown in the lower half part under the center axis 10 of FIG. 1, then the position of the movable mold 13 is d0=0 mm and the corresponding position of the cross head 17 is also x0=0 mm.

For example, the assumption is made that the user sets the target position of the movable mold 13 at 30 mm with the use of the movable mold position setting unit 35. The setting data of 30 mm is outputted to the cross head position/movable mold position converting unit 34. The cross head position/movable mold position converting unit 34 refers the correspondence table 36 to obtain the cross head position x2=5.0 mm corresponding to d2=30 mm.

The target position 5.0 mm of the cross head 17 thus obtained is supplied to the cross head position controlling unit 33, causing the servo-motor 30 to be driven toward the stationary mold 11 and to be stopped at the position where the cross head 17 has moved 5.0 mm from its initial position x0=0 mm.

On the other hand, in the case where the position of the movable mold 13 set by the user is 25 mm, for example, this target position is in the middle between d1=20 mm and d2=30 mm, and thus the value of the corresponding cross head position will be in the middle between x1=1.0 mm and x2=5.0 mm.

In the case where the target position of the movable mold 13 is set at a value not included in the correspondence table 36 as described above, the position of the cross head 17 corresponding to such a value is determined by the interpolation operation. In the following, description will be made with reference to FIG. 4.

Figure 4:
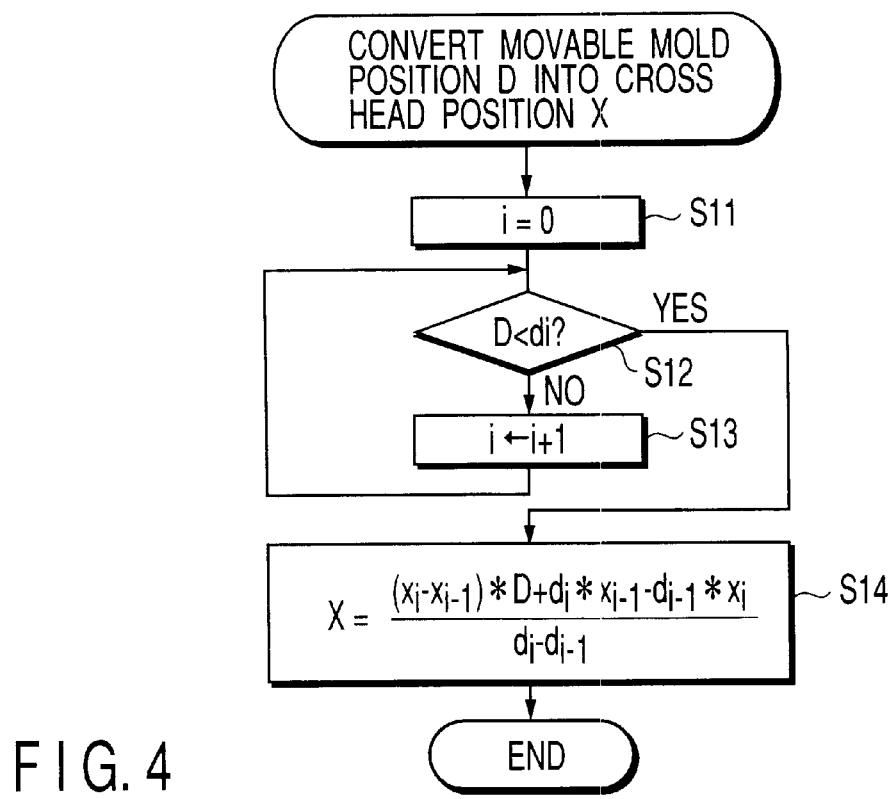
FIG. 4 is a flow chart for explaining the operation of the one embodiment.

The flow of the processing for converting the target position D=25 mm of the movable mold 13 into the target position X of the cross head is shown in FIG. 4, and at the first step S11, the setting of di=0 is made.

Starting from this condition, the processing goes to step S12 where the movable mold position D=25 mm is compared with d0=0 mm. Since D>di in this case, the processing goes to step S13 where i is incremented by 1 so that di becomes d1.

The value of d1 (=20 mm) is read out from the correspondence table 36 and compared with D=25 mm again at step S12.

Since D>di in this case again, the processing returns to step S12 again where i is incremented by 1 so that di becomes d2. Since the value of d2 is 30 mm, the relation D<di is attained at step S12 and the processing goes to step S14.

At step S14, by using the two movable mold positions d1=20 mm and d2=30 mm, the cross head positions corresponding thereto x1=1.0 mm and x2=5.0 mm, and the target position D=25 mm of the movable mold 13, the cross head position X corresponding to D=25 mm is calculated. The calculation equation is as follows:

$$X=((x_i-x_{i-1})*D+d_i*x_i-1-d_{i-1}*x_i)/(d_i-d_{i-1}) \quad (1)$$

In this way, it is possible to determine the cross head position X corresponding to the movable mold position D not included in the correspondence table 36 easily by the calculation.

The cross head position X thus determined is supplied to the cross head position controlling unit 33, and the cross head 17 is controlled so as to approach the target position.

AS the cross head 17 gradually approaches the target position X, also the movable mold 13 is moved via the link mechanism 15. The track positions on the way to the final target position D are displayed on the movable mold position display unit 37. For achieving this, it is necessary to obtain the current position of the cross head 17 which varies every moment from the cross head position detecting unit 32 to convert the current position into the movable mold position. The calculation for this is performed according to the flow of FIG. 5.

Figure 5:
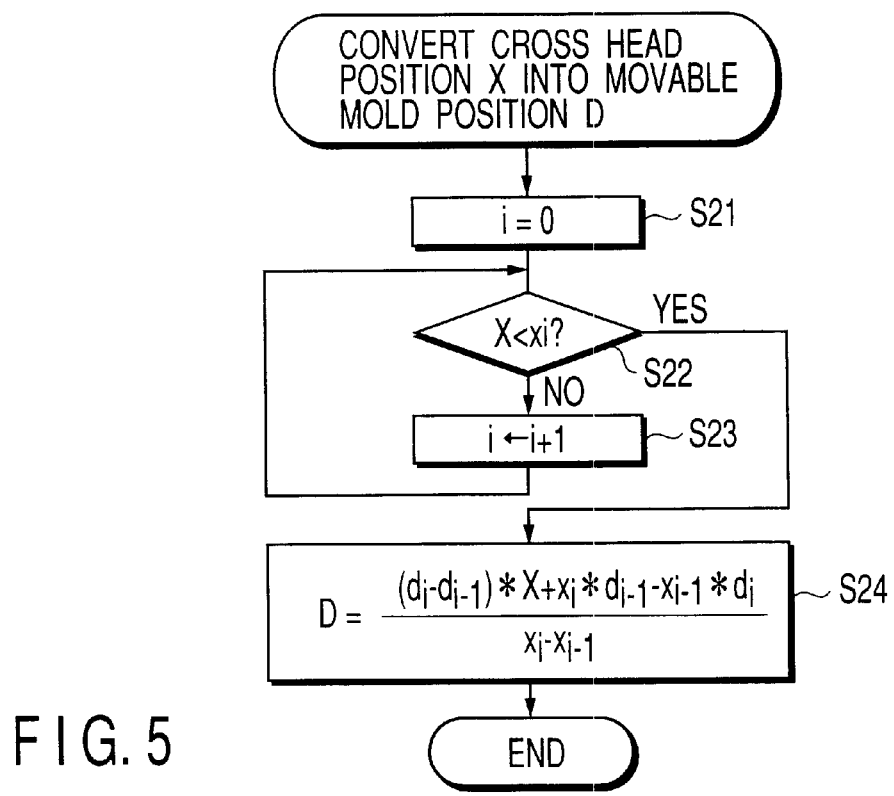
FIG. 5 is a flow chart for explaining the operation of another embodiment.

The flow for the processing of converting the cross head position X (for example X=4.0 mm) into the movable mold position D is shown in FIG. 5, and the setting of xi=0 is made at the first step S21.

Starting from this condition, the processing goes to step S22 where the cross head position X is compared with x0=0 mm. Since X>xi in this case, the processing goes to step S23 where i is incremented by 1 so that xi becomes x1.

The value of x1 (=1.0 mm) is read out from the correspondence table 36 and compared with X again at step S22.

Since X>xi in this case again, the processing returns to step S22 again where i is incremented by 1 so that xi becomes x2. Since the value of x2 is 5.0 mm, the relation X<xi is attained at step S22 and the processing goes to step S24.

At step S24, by using the two cross head positions x1=1.0 mm and x2=5.0 mm, the movable mold positions corresponding thereto d1=20 mm and d2=30 mm, and the cross head position X=4.0 mm, the movable mold position D corresponding to X=4.0 mm is calculated. The calculation equation is as follows:

$$D=((d_i-d_{i-1})*X+x_i*d_{i-1}-x_{i-1}*d_i)/(x_i-x_{i-1}) \quad (2)$$

In this way, it is possible to determine the movable mold position D corresponding to the cross head position X not included in the correspondence table 36 easily by the calculation.

The value of the movable mold position D thus obtained is supplied to the movable mold position display unit 37 to be displayed to the user.

By the way, the values not included in the correspondence table 36 may have conversion errors because they are subjected to the interpolation operation according to the equations (1) and (2). Such conversion errors can be reduced by increasing the number of data in the correspondence table.

As detailed above, according to the present invention, it is possible to provide an apparatus and method for position setting of a motor-driven injection molding machine which can facilitate the calculations for determining the movable mold position from the cross head position and vice versa, facilitate the position setting concerning clamping operation and increase the processing speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A position setting method for a movable mold of a motor-driven injection molding machine, comprising:

detecting a position of a crosshead which is driven by a servo-motor;

preliminarily storing correspondence between positions of the crosshead and positions of the movable mold, which is coupled to the crosshead via a link mechanism, in a memory table; and obtaining a position of the movable mold based on the detected position of the crosshead by referring to the memory table, wherein the obtaining comprises:

reading out from the memory table, when a position of the crosshead corresponding to a target position of the movable mold is not stored in the memory table, two positions of the crosshead corresponding to two positions of the movable mold, between which the target position lies; and calculating a value of an intermediate position between the two positions of the crosshead.

2. A position setting method according to claim 1, wherein the two positions of the crosshead are given by linear functions.

3. A position setting method according to claim 1, wherein the calculating includes performing interpolation.

4. A position setting method according to claim 1, wherein the obtaining comprises:

reading out from the memory table, when a position of the movable mold corresponding to the detected position of the crosshead is not stored in the memory table, two positions of the movable mold corresponding to two positions of the crosshead, between which the detected position of the crosshead lies, and calculating a value of an intermediate position between the two positions of the movable mold.

5. A position setting method according to claim 4, wherein the calculating includes performing interpolation.

6. A position setting method according to claim 1, further comprising displaying the calculated position of the movable mold.

7. A position setting apparatus for a movable mold of a motor-driven injection molding machine comprising:

means for detecting a position of a crosshead driven by a servo-motor;

a memory table in which a corresponding table showing correspondence between positions of the crosshead and positions of the movable mold coupled to the crosshead via a link mechanism is preliminarily stored;

crosshead position/movable mold position conversion means for converting a position of the movable mold into a position of the crosshead by referring to the memory table when a set position command is input and further converting a current position of the crosshead into a position of the movable mold; and crosshead position control means for controlling the servo-motor in response to the output from the detecting means and the crosshead position/movable mold position conversion means;

wherein when the position of the crosshead corresponding to a set target position of the movable mold is not stored in the memory table, two positions of the crosshead corresponding to two positions of the movable mold, between which the target position lies, are read out from the memory table; and a value of the position of the crosshead is calculated by interpolation using the target position and the two positions of the crosshead.

8. A position setting apparatus to claim 7, wherein the interpolation is given by a linear function.

9. A position setting apparatus according to claim 7, wherein when the position of the movable mold corresponding to a current position of the crosshead is not stored in the memory table, two positions of the movable mold corresponding to two positions of the crosshead, between which the current position of the crosshead lies, are read out from the memory table; and a value of the position of the movable mold is calculated by interpolation using the current position of the crosshead and the two positions of the movable mold.

10. A position setting apparatus according to claim 9, wherein the interpolation is given by a linear function.

* * * * *